Patented Aug. 27, 1940

2,212,984

UNITED STATES PATENT OFFICE 2,212,984

GLASS MOLD

William McKain Greed, Washington, Pa., assignor of two-thirds to J. Alvin Weirich, Washington, Pa.

No Drawing. Application April 17, 1937, Serial No. 137,586

5 Claims. (Cl. 49—65)

This invention relates to glass molds, and particularly to a new alloy for use in lining glass molds or for surfacing tools or other articles apt to be subjected to molten glass at high temperatures, and the process of applying such lining or coating.

In glass molding, it is essential that the molds retain their form and smoothness of surface without becoming pitted or roughened, so that the glass will readily separate therefrom. In order to prevent sticking, molders usually wipe the mold with a lubricant, such as oil, rubber, sulfur, graphite compounds, beeswax or leather, and the surface of the molds becomes roughened by a scale which includes not only the dirty residue from such lubricants, but, also, the products of their reaction with the metal of the mold, particularly from the oxidation of the metal. It is customary to remove this scale by scraping the mold with a hard stone, or other suitable material, which necessarily slightly alters the shape of the mold, so that the mold is gradually worn away and its useful life is shortened.

One of the objects of the invention is to provide a mold, and articles used therewith and subjected to contact with molten glass, which will not become oxidized and may be readily cleaned without abrasion. A further object is to provide a mold of this kind which may be economically produced and which will be durable and efficient. Other objects are to provide a composite mold in which injury to the mold as a whole by reason of unequal expansion of the various layers is avoided, and to provide such a mold which will not become pitted during use or during the process of cleaning.

Briefly, the invention comprises providing a mold of cast iron, or similar base metal, with a liner of an alloy of from 65 per cent to 75 per cent nickel, from 23 per cent to 35 per cent copper, and from 1 per cent to 8 per cent tin, with the addition, for some uses, of from ½ per cent to 3 per cent cadmium, or the addition of less than 3 per cent of cadmium and zinc. The liner may be separately formed and then welded to the cast iron mold base, but is preferably built up upon the preheated mold or other surface by oxy-acetylene welding, the lining being preferably from 0.2 inch to 0.5 inch in thickness.

It has been proposed heretofore to form a glass mold of non-oxidizable metal, or to line a glass mold with such metal, particularly Monel metal which contains from 60 per cent to 70 per cent nickel and 25 per cent to 35 per cent copper. However, I have found that the addition of a small percentage of tin to such a metal, and particularly when the alloy is applied by oxyacetylene welding, provides a smooth durable surface which is not only non-oxidizing, but also is harder, smoother and not attacked by dilute sulfuric acid or hot lye solution, and does not become pitted. As a consequence, the mold can be cleaned of the accumulated dirt of whatever nature merely by wiping with dilute sulfuric acid or hot alkali solutions, or similar solvents, to leave a smooth clean surface, so that the use of abrasives of any nature is entirely avoided and the life of the mold is extended indefinitely.

I have made satisfactory molds lined with alloys having rather widely varied proportions, as follows:

|    | 1 | 2 | 3 | 4 |
|----|---|---|---|---|
|    | Percent | Percent | Percent | Percent |
| Ni | 69 | 70 | 70 | 86 |
| Cu | 30 | 25 | 27 | 8 |
| Sn | 1 | 5 | 3 | 6 |

The preferred composition is approximately that of the third example stated above, that is, nickel about 70 per cent, copper about 27 per cent and tin about 3 percent, with the incidental impurities usually encountered. A content of manganese in an appreciable amount up to 3.0 per cent has been found to have some beneficial effects without entailing any detrimental effects, and cadmium up to 3 per cent, or cadmium and zinc each in an amount less than 3 per cent, may be added to alter various properties of the alloy without detrimental results.

As stated above, the lining of the mold is preferably accomplished by building up the alloy material upon the mold base by oxyacetylene welding. The rough mold base, preferably of grey cast iron, is preheated in a gas furnace to a temperature of approximately 1350° F. to 1450° F. The alloy, preferably in the form of welding rods of approximately 0.25 inch diameter, is applied in the usual manner by autogenous welding with an oxyacetylene blow pipe, the preheating of the base rendering it easy for the operator to control the temperature of both the base metal and the alloy so that a good weld will be insured, and any suitable flux may be used.

The lining is applied in a thickness which varies with the size and type of the mold, and its intended use, but, in general, its thickness is preferably about 0.2 inch. The coefficient of linear expansion per degree centigrade of the new alloy is from 0.000014 to 0.000017, which is substantially the same as that of Monel metal, and approximately that of the grey cast iron used to form the base of the mold. The rates of expansion of the alloy and the base, therefore, do not differ to such an extent as to result in separation of the parts even when the alloy liner is applied by arc welding, and, when the lining has been built up on the mold base by autogenous welding, the bond between the layers is exceptionally strong, by reason of the intermediate zone of mixed composition, and the presence of tin in the alloy materially increases its tensile strength, especially when in low amount. It will be understood that the tin content may be varied, and that of manganese, cadmium or zinc, in small amounts may be added to vary the rate of thermal expansion, to vary the hardness so that the lining may be machined as desired, or to vary other characteristics within reasonable limits. It will likewise be understood that the alloy may be used not only for lining the mold itself, but, also, to cover the surface of tools and other articles used in glass molding in contact with the molten glass, and the term "mold" is used herein to include such tools and similar articles.

What I claim is:

1. A mold for forming articles of molten glass having its molding surface formed of an alloy comprising nickel about 70 per cent, copper about 27 per cent, and tin about 3 per cent.

2. A mold for forming articles of molten glass consisting of a base of cast iron having a surface layer of an alloy autogenously welded thereto, said alloy containing between 25 per cent and 30 per cent of copper and between 1 per cent and 6 per cent of tin and the balance substantially all nickel.

3. A mold for forming articles of molten glass consisting of a ferrous base having a surface layer of an alloy welded thereto, said alloy being composed of nickel, about 70 per cent, copper, about 27 per cent, and tin, about 3 per cent.

4. A mold for forming articles of molten glass having its molding surface formed of a nickel-copper-tin alloy that is weldable and resistant to adhesion of molten glass, said alloy consisting of copper in amounts ranging from 25 to 35 per cent, tin in amounts ranging from 1 to 6 per cent, and the remainder substantially all nickel with a small amount of other elements which do not affect the above specified characteristics of the alloy.

5. A mold for forming articles of molten glass comprising a ferrous base having a lining welded thereto, said lining being formed of a nickel-copper-tin alloy that is weldable and resistant to adhesion of molten glass, said alloy consisting of copper in amounts ranging from 25 to 35 per cent, tin in amounts ranging from 1 to 6 per cent, and the remainder substantially all nickel with a small amount of other elements which do not affect the above specified characteristics of the alloy.

WILLIAM McK. GREED.